UNITED STATES PATENT OFFICE.

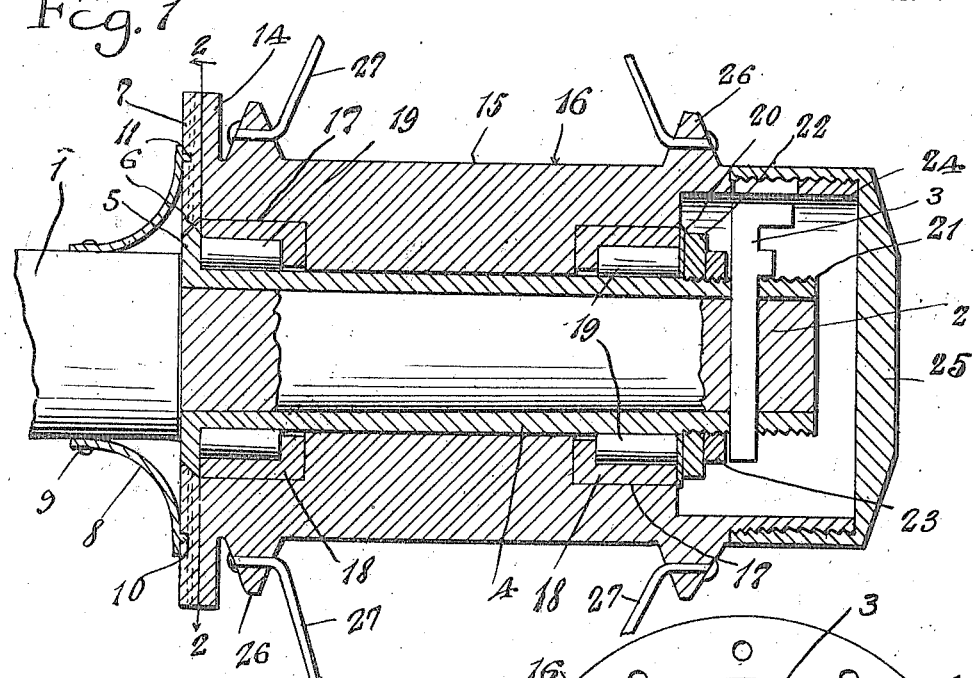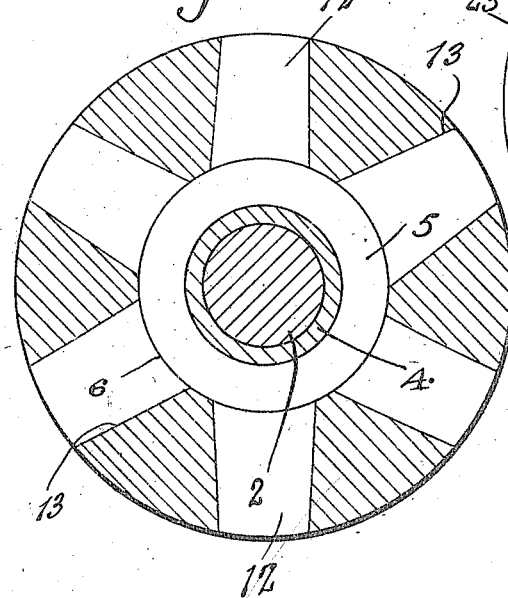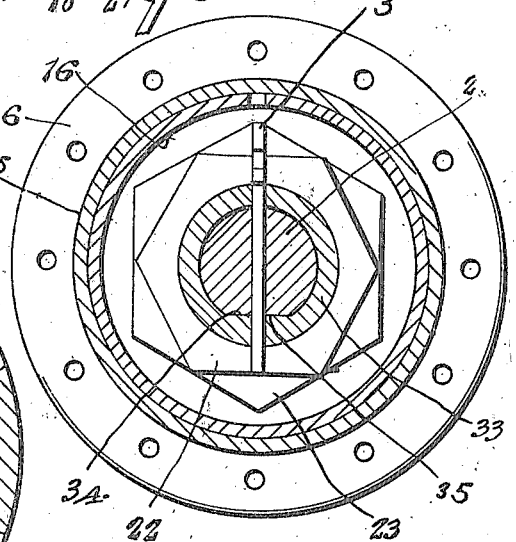

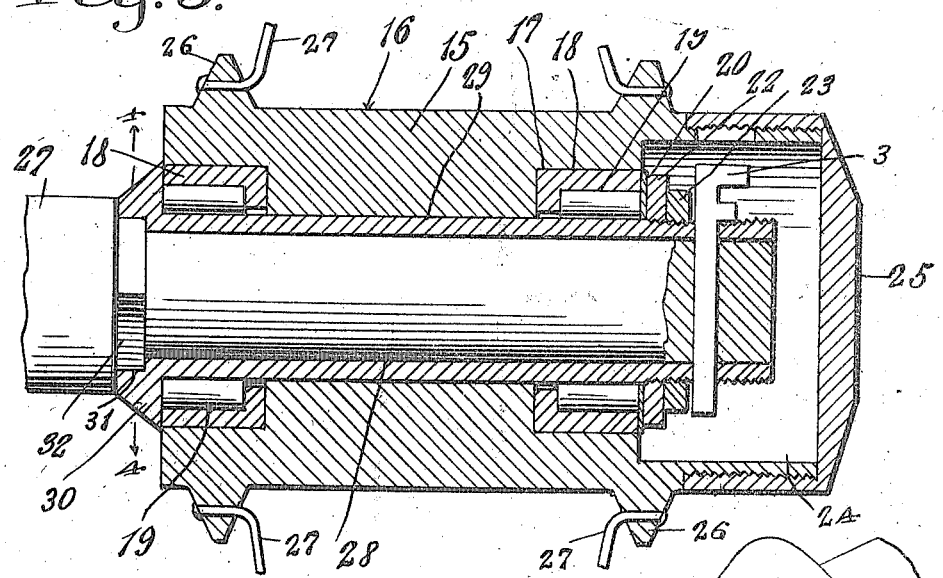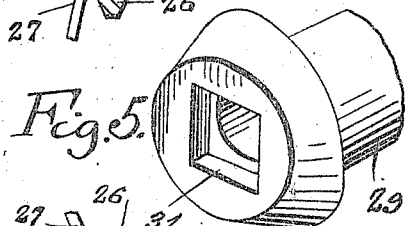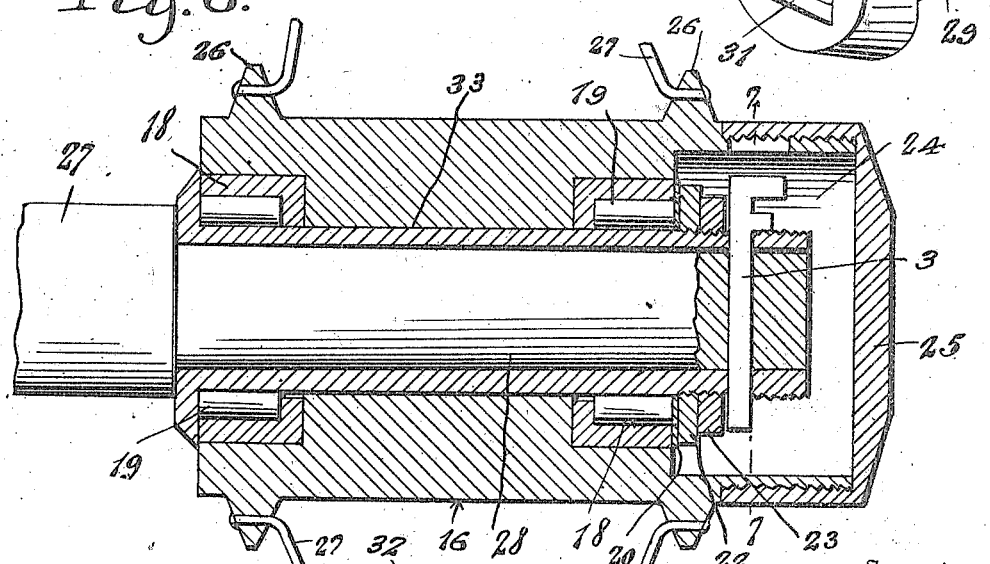

WILLIAM FITZHUGH LEE, OF SYRACUSE, NEW YORK.

ROLLER-BEARING DEMOUNTABLE AUTOMOBILE-HUB.

1,257,893.  Specification of Letters Patent.  Patented Feb. 26, 1918.

Application filed August 4, 1917. Serial No. 184,515.

*To all whom it may concern:*

Be it known that I, WILLIAM F. LEE, a citizen of the United States, residing at Syracuse, in the county of Onondaga and State of New York, have invented certain new and useful Improvements in Roller-Bearing Demountable Automobile-Hubs; and I do hereby declare the following to be a full, clear, and exact description of the invention, such as will enable others skilled in the art to which it appertains to make and use the same.

This invention relates to improvements in a roller bearing demountable automobile hub and has for one of its objects the provision of a device of this character, whereby the hub may be readily and conveniently secured upon the spindle of an axle.

Another object of this invention is the provision of a body portion to the hub having roller bearings therein adapted to bear upon a sleeve carried by the spindle of the axle, whereby all undue friction is obviated.

A further object of this invention is the provision of a novel means of locking the body of the hub to the axle so that the body of the hub will be compelled to rotate in unison therewith.

A still further object of this invention is the provision of a roller bearing demountable automobile hub of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a fragmentary vertical sectional view of a roller bearing demountable automobile hub constructed in accordance with my invention, Fig. 2 is a transverse sectional view taken on the line 2—2 of Fig. 1, illustrating the means for establishing a connection between the body of the hub with the axle, Fig. 3 is a fragmentary vertical sectional view of a modified form of hub illustrating the means of connecting the body of the hub with the axle, Fig. 4 is a transverse sectional view taken on the line 4—4 of Fig. 3, Fig. 5 is a fragmentary perspective view of a modified form of sleeve illustrated in my modified form of invention as disclosed in Fig. 3, Fig. 6 is a fragmentary vertical sectional view of another modified form of means for securing the body of the hub to the axle, Fig. 7 is a transverse sectional view taken on the line 7—7 of Fig. 6.

Referring in detail to the drawing, the numeral 1 indicates the rear axle of an automobile or like vehicle and has formed thereon, a spindle 2. The spindle 2 is provided with a slot in its outer end to receive a pin 3, which is of F-shape formation. The arm portion of the pin 3 limits the movement of the same in the slot of the spindle.

A sleeve 4 is positioned upon the spindle 2 and is provided with oppositely disposed slots to receive the pin at one end thereof, while its opposite end is provided with a flange 5 having a beveled face 6. A disk 7 is provided with a central opening, the wall of which is beveled to conform to the beveled face 6 of the flange 5 so as to permit the flange 5 to rotate freely within the disk. A securing member 8 is secured to the axle as at 9 and has formed thereon, a plurality of lugs or projections 10, which are adapted to fit within the recesses or sockets 11 formed in the outer face of the disk so that the disk is locked against rotation with relation to the axle 1.

The inner face of the disk 7 is provided with a plurality of radially arranged depressions 12, which form upon the disk, raised portions 13, which raised portions are adapted to fit within depressions formed in a flange 14 formed upon the body 15 of the hub 16. The flange 14 being provided with depressions similar to the depressions 12 in the disk 7, which form thereon, raised portions similar to the raised portions 13 that fit within the depressions 12 for establishing a locking connection between the body portion 15 of the hub 16 and the disk 7. The body portion 15 is provided with cut away portions 17 in annular formation adjacent each end to receive bushings 18. The bushings 18 receive roller bearings 19 that bear upon the sleeve 4. The outer end of the sleeve 4 has positioned thereon, a washer 20 for the purpose of retaining the outer bearing rollers 19 within their respective bushings. The outer end of the sleeve is screwthreaded as at 21 and has threaded thereon, a retaining nut 22, which engages the washer 20 and holds the same in engagement with the outer roller bearing.

A jam nut 23 is also threaded to the sleeve and in engagement with the nut 22 to prevent the nut 22 from becoming accidentally unthreaded from the sleeve. The jam nut 23 is held upon the sleeve 21 by the pin 3, as clearly illustrated in Fig. 1.

The other end of the body portion 15 of the hub 16 is reduced and screwthreaded as shown at 24 and has threaded thereon, a cap 25. The reduced threaded portion 24 of the body portion 15 of the hub 16 is provided with a slot for the purpose of permitting the pin 3 to be removed from and inserted through the slot 4 of the spindle 2. The cap 25 after being threaded on the body portion 15 of the hub 16 prevents the pin 3 from moving out of the slots in the sleeve 4 and spindle 2.

A plurality of studs 26 are formed upon the periphery of the body portion 15 of the hub 16 adjacent each end and has secured thereto, wire spokes 27, which are in turn connected to the usual rim of a wire wheel, (not shown).

In operation, when the axle 1 is rotated by a prime mover, the member 18 causes the disk 7 to rotate therewith. The disk 7 being locked to the flange 14 carried by the body portion 15 of the hub 16, causes said hub to rotate with the axle upon the sleeve 4. It will also be noted that the pin 3 prevents any endwise movement of the hub 16 and sleeve 4 upon the spindle 2.

Referring to my modified form of invention as shown in Fig. 3, it consists of a hub especially adapted for use upon front axles, the numeral 27' being the front axle having the usual spindle 28, which is apertured to receive the pin 3. The spindle 28 has mounted thereon, a sleeve 29, which has its outer end provided with oppositely disposed slots to receive the pin 3, while its opposite end is provided with a flange 30. The flange 30 is provided with a rectangular recess or socket 31, which is adapted to receive a rectangular shoulder 32 formed upon the axle 27 at the point of formation of the spindle 28 thereto, whereby the sleeve 29 is held against rotation with relation to the axle or spindle. The sleeve 29 has mounted thereon, the body portion 15 of the hub 16, which is provided with the recesses 17 to receive the bushings 18. The bearing rollers 19 are located within the bushings 18 and bear upon the sleeve 29, whereby the body portion 15 of the hub 16 may rotate freely upon the sleeve. The hub 16 has secured thereto, the top 25 in the manner heretofore described in my preferred form of invention or the form of invention employed upon the rear axle of an automobile or like vehicle. The sleeve 29 is provided with oppositely disposed slots to receive the pin 3 and also screwthreaded to receive the washer 20, nut 22 and jam nut 23. From the foregoing description taken in connection with the accompanying drawing, it will be noted that a novel form of hub has been provided, which can be readily and conveniently applied to the front axle of an automobile or like vehicle and which will rotate upon the sleeve with a minimum amount of friction.

Referring to my modified form of invention as disclosed in Fig. 6, it consists of a modified form of means for securing the sleeve 33 to the spindle 28 of the front axle 27. The spindle 28 in this instance is provided with a flattened portion 34 or a fractional part thereof may be flattened, which fits the flattened portion 35 in the sleeve 33, whereby the sleeve 33 is held against rotation with relation to the spindle.

While I have shown and described the preferred embodiment of my invention, it will be understood that minor changes in construction, combination and arrangement of parts may be made without departing from the spirit and scope of the invention as claimed.

What is claimed is:

1. The combination with an axle including a spindle having a slot, of a sleeve mounted on said spindle and having oppositely disposed slots, an F-shaped key extending through the slots of the sleeve and spindle, a hub journaled on said sleeve, said sleeve having its outer end screwthreaded, a nut threaded on said sleeve, and a jam nut threaded on said sleeve in engagement with said nut.

2. The combination with an axle having a spindle, of a sleeve mounted upon said spindle, a key securing the sleeve to the spindle against rotation thereon, a flange formed on the sleeve, a disk mounted upon said flange, means securing said disk to the axle, a hub journaled on said sleeve, a flange formed on said hub and having depressions therein, forming offset portions, said disk having recesses therein forming offset portions, said offset portions of the disk fitting within the depressions in the flange and the offset portions upon the flange fitting within the depressions in the disk to lock the hub to the axle.

3. The combination with an axle having a spindle, of a sleeve mounted on said spindle, means connecting the sleeve to the spindle against rotation thereon, a hub journaled on said sleeve, a flange formed on said sleeve, a disk mounted on said flange, a securing member secured to the axle and to said disk, a flange formed on said hub, and means connecting the disk to said flange.

4. A device of the character set forth comprising a sleeve mounted upon a spindle, a hub journaled on said sleeve, a pin extending through the sleeve and spindle, and a cap threaded to said hub for preventing the pin from becoming disengaged from the sleeve.

In testimony whereof I affix my signature in presence of two witnesses.

WILLIAM FITZHUGH LEE.

Witnesses:
 ALBERT E. SNYDER,
 EDWARD J. MADDEN.